United States Patent [19]

Lowther

[11] 3,996,122
[45] Dec. 7, 1976

[54] CORONA REACTION SYSTEM

[75] Inventor: Frank E. Lowther, Severna Park, Md.

[73] Assignee: Union Carbide Corporation, New York, N.Y.

[22] Filed: Feb. 20, 1975

[21] Appl. No.: 579,739

Related U.S. Application Data

[62] Division of Ser. No. 387,972, Aug. 13, 1973, abandoned.

[52] U.S. Cl. .............................. 204/176; 250/531; 250/541
[51] Int. Cl.² ........................................ C01B 13/11
[58] Field of Search ............. 204/176; 250/531–541

[56] References Cited

UNITED STATES PATENTS

| | | | |
|---|---|---|---|
| 3,551,321 | 12/1970 | Guillerd et al. | 250/540 |
| 3,833,492 | 9/1974 | Bollyky | 204/176 |

FOREIGN PATENTS OR APPLICATIONS

| | | | |
|---|---|---|---|
| 689,301 | 6/1964 | Canada | 250/541 |

Primary Examiner—F.C. Edmundson
Attorney, Agent, or Firm—John C. LeFever

[57] ABSTRACT

A system for subjecting gas to high voltage corona wherein a gas is sequentially (serially) exposed to a plurality of corona generation zones. In a preferred system, the gas is conducted through several corona generators which are connected in series by gas conduits, and the gas within the system is cooled subsequent to each exposure to corona.

9 Claims, 6 Drawing Figures

CORONA REACTION SYSTEM

This is a division of application Ser. No. 387,972, filed Aug. 13, 1973, now abandoned.

The present invention relates to an improved method and means for conducting corona induced reactions, and more specifically to a novel system in which gases may be efficiently exposed to the effect of high voltage corona discharge generators.

It is well-known that a wide variety of gases may be exposed to the effect of high voltage corona to obtain a multitude of reaction products. Perhaps the best known corona induced reaction involves the exposure of oxygen to a zone of high voltage potential to obtain ozone and considerable quantities of excess heat.

In order to handle the large amounts of heat which are liberated during corona discharge, prior art corona generators are designed to include elaborate heat exchange means to remove excess heat through adjacent electrode surfaces. An alternative means for cooling corona generators involves passing quantities of reaction gases through the corona discharge zone which are large in comparison to the power discharged therein. Both of these methods for heat removal present inherent drawbacks in that either complex and expensive to operate equipment is required or extremely low concentrations of reaction products are obtained.

It is therefore an object of the present invention to provide an improved method and means for inducing corona discharge reactions.

It is a further object to provide inexpensive systems for conducting corona discharge reactions which are economical to operate and which utilize readily available component parts.

It is yet another object to provide an apparatus which is capable of producing high concentrations of corona discharge reaction products at relatively low cost.

It is still a further object to provide a practical commercial method by which tonnage quantities of high concentration ozone can be produced at reasonable cost.

These and still further objects of the present invention will become readily apparent to one skilled in the art from the detailed description and drawings wherein.

Broadly, my invention comprises a plurality of corona discharge devices which are connected in series by gas conduit means, and in a particularly preferred embodiment a gas cooling means is interconnected between each pair of corona discharge devices.

More specifically, I have found that conventional corona generation systems may be more efficiently and effectively operated by placing at least two corona generators in series in terms of gas flow. Furthermore, substantial additional benefit is obtained if subsequent to passing the reaction gas through a first corona generator, the reaction product gas is cooled prior to being passed through the second corona generator. In the event more than two corona generators are present in the system, cooling of the product gas is preferably provided prior to reaction in any subsequent generator.

Figure 1:
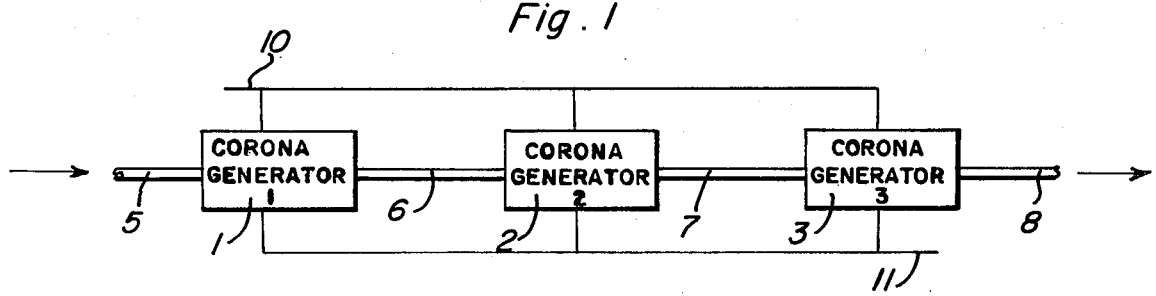
FIG. 1 is a schematic diagram of series connected corona discharge generators which comprises one embodiment of the present invention.

A more clear understanding of my present invention may be obtained by reference to the drawing. Specifically, FIG. 1 represents one preferred embodiment wherein corona generators 1, 2 and 3 are connected operatively in series by means of gas conduit tubes 5, 6, 7 and 8. It is noted that gas conduit 5 admits reaction gas to the first corona generator 1. Gas conduit 6 connects corona generator 1 in series to corona generator 2, and gas conduit 7 connects corona generator 2 to corona generator 3. The gas conduit 8, as illustrated in FIG. 1, provides an exit for the final reaction products from the last of the series connected corona generator 3. FIG. 1 also shows that high voltage potential is provided by electrical conduits 10 and 11. Electrical conduits 10 and 11 are connected to the high voltage AC voltage source (not shown). The high voltage source AC which is conventional and readily available from many commercial manufacturers is capable of providing a voltage in the range of from about 1,000 to 30,000 peak volts at frequencies of 50 to 100,000 cps.

Figure 2:
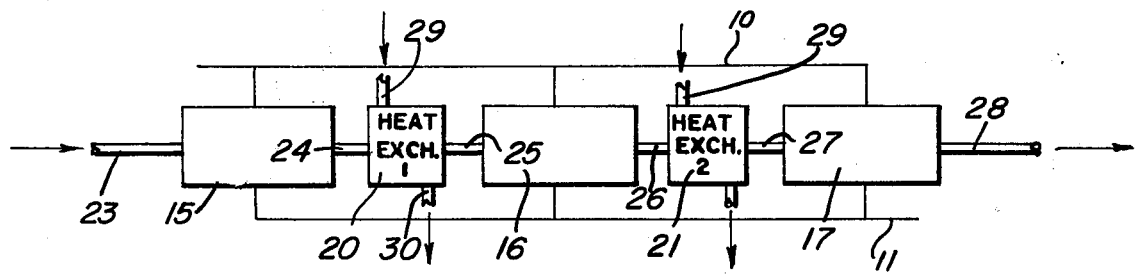
FIG. 2 illustrates another embodiment wherein series connected corona discharge generators are provided with intercooling means.

The device or system illustrated in FIG. 2 represents a particularly preferred embodiment of the present invention wherein intercooling means are provided between each pair of corona generators. Specifically, referring to FIG. 2, it is seen that corona generators 15, 16 and 17 are interconnected in series with gas cooling means 20 and 21. Gas which is to be reacted in the system enters conduit 23 into the first corona generator 15. Conduit 24 interconnects the first corona generator 15 with the first cooling means 20, and conduit 25 connects the first cooling means 20 with the second series connected corona generator 16. Furthermore, conduit 26 connects the second corona generator 16 with the second gas cooling means 21, and the conduit 27 connects cooling means 21 with the last shown series connected corona generator 17. The corona generator 17 is connected to the outlet conduit 28. Furthermore, as shown in FIG. 2, the corona generators 15, 16 and 17 are connected to a source of high voltage potential by means of electrical conduits 10 and 11 as described with respect to the apparatus in FIG. 1.

The cooling means 20 and 21 comprise conventional heat exchange devices which are provided with cooling medium conduits 29 and 30. The cooling medium which enters the conduit 29 and exits through the conduit 30 may be either liquid or gas.

Figure 3:
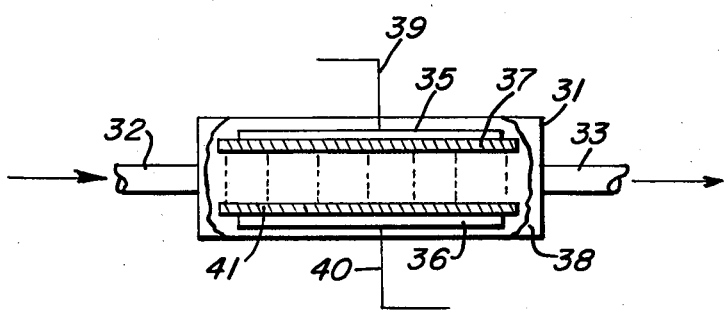
FIGS. 3, 4 and 5 illustrate (with parts broken away) typical electrode configurations of corona generators which may be used in the systems set forth in FIGS. 1 and 2.
Figure 4:
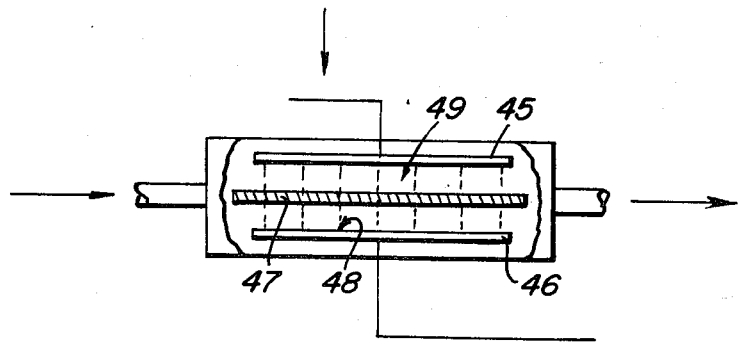
Figure 5:
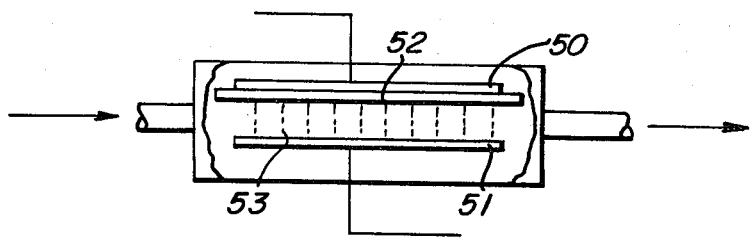

The corona generators 1, 2 and 3 shown in FIG. 1, and 15, 16 and 17 as shown in FIG. 2 are conventional in construction and possess electrode configurations which are typically illustrated in FIGS. 3, 4 and 5. Specifically, referring to FIG. 3, it is seen that the corona generator electrodes are enclosed in a housing 31 which is provided with a gas inlet conduit 32 and a gas outlet conduit 33. Within the housing 31 are mounted discharge electrode plates 35 and 36. The discharge electrode plates 35 and 36 are separated by means of adjacently located dielectric plates 37 and 38. The electrode plates 37 and 36 are connected respectively to a source of high voltage potential by means of electrical conduits 39 and 40. Between the dielectric plates 37 and 38 is defined a corona discharge gap 41. As shown in the drawing, this gap is exaggerated in size and normally will comprise a distance ranging from about 1/10,000ths to ½ inch in distance between the dielectric plates 37 and 38.

The electrode configuration shown in FIG. 4 differs from that shown in FIG. 3 in that high voltage electrodes 45 and 46 are separated by means of a dielectric plate 47 which is spaced away from the surfaces of the electrodes 45 and 46. Between the electrodes 45 and 46 a corona discharge gap is defined in spaces 48 and 49.

FIG. 5 contains an electrode configuration wherein high voltage electrode plates 50 and 51 are separated by means of dielectric plate 52 which is located adjacent to electrode plate 50. A corona gap 53 is defined in the space between the dielectric plate 52 and the electrode plate 51.

It is to be understood that the corona generators used in the practice of the present invention are conventional, and they may utilize the electrode configurations shown in FIGS. 3, 4 and 5. Furthermore, it is to be understood that other varieties of electrode configurations including both flat and round or curved surfaces may be utilized to advantage.

Figure 6:
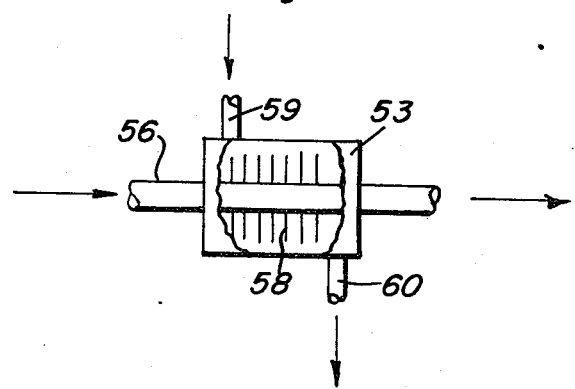
FIG. 6 represents a typical heat exchange device (with parts broken away) which may be used as intercooling means in the system of FIG. 2.

FIG. 6 shows details of a typical heat exchange device which may be used in the practice of the present invention. The heat exchange device 20 and 21 of FIG. 2 may typically comprise the structure described in the FIG. 6. In FIG. 6 a housing 55 is provided with a gas conduit 56. Within the housing 55 as shown in FIG. 6, the gas conduit 56 is provided with cooling fins 58. The housing is also provided with cooling medium conduits 59 and 60. While FIG. 6 portrays a typical closed type heat exchange device it is to be understood that the apparatus shown in FIG. 2 may utilize other conventional type heat exchangers including those which are cooled by gas convection and radiation.

In operation, the device of FIG. 1 is provided with a source of reactant gas through the entry conduit 5. For purposes of the present description, the operation of the system will be defined in terms of oxygen as the reactant gas. However, it is to be understood that a wide variety of reactant gases such as nitrogen and organic derivatives may also be used. Oxygen entering the first corona generator through entry conduit 5 is subjected to conditions of corona discharge which are provided within the corona generator 1. Corona discharge, which involves impressing a high voltage across a defined electrode gap and ionizing a gas therein, is provided for in the corona generator 1 by applying a source of high voltage potential to the electrical conduits 10 and 11 to suitable electrode surfaces such as shown in FIGS. 3, 4 and 5. As indicated above, the electrical potential between the discharge electrode plates may vary from 1,000 to 30,000 peak volts which is provided for by a high voltage transformer and frequency multiplier means which typically produces potential at a frequency which may range from about 60 to as high as 100,000 cps. The electrical power which is dissipated within the corona generator may range from about 100 to 100,000 watts/ft$^2$ of electrode surface area. Furthermore, the reactant gas which enters through conduit 5 may be maintained at practically any pressure, but preferably pressures on the order of about ½ to 50 psia are utilized. Furthermore, the distance between the discharge electrodes is preferably on the order of 1/10,000ths to ½ inch.

Subsequent to establishing a corona reaction in the first corona generator 1, as shown in FIG. 1, the reactant gas exits through conduit 6 and is conveyed to the second corona generator 2. The corona discharge treatment of the gas is then repeated, and the reactant gases exit through conduit 7 to enter the third corona generator 3. The gas is again subjected to corona discharge in the generator 3 and exits the system through conduit 8.

In a typical reaction, it is found that within the first corona discharge device, oxygen is converted to a reactant product stream which contains typically 2 percent ozone. Within the second corona generator the concentration of the ozone is approximately doubled to 4 percent. In the third corona generator, the ozone concentration will be increased by another 2 percent. Therefore, it is seen that by using three series connected corona generators a product gas is readily obtained which contains 6 percent ozone. Furthermore, it is found that by operating the ozone generators 1, 2 and 3 in series instead of in parallel a substantially greater gas flow may be maintained within the generators. It is found that this increased gas flow serves two useful functions, the first being stagnant pockets of reactant gas within the generators are eliminated and second, the increased rate of flow provides for substantial cooling of the electrode surfaces. In typical operations it is found that ozone using the series connected system set forth in FIG. 1 will produce concentrated ozone at a considerable cost (power) saving as opposed to typical prior art parallel connected generator systems.

The system shown in FIG. 2 represents a particularly preferred embodiment of the present invention. In operation, the device in FIG. 2 is provided with a source of reactant gas through entry conduit 23. The first corona discharge reaction is conducted in the first corona generator 15 and subsequently, the reactant gas exits through conduit 24 into the intercooler heat exchange device 20. The reactant gas which passes through the first corona generator will frequently undergo a temperature increase of from 100° to 150° C. This temperature increase is due to the generation of excess heat within the corona discharge gap. This excess heat will amount to approximately 90 percent of the power consumed by the generator. The hot reaction gas which exists through conduit 24 enters the heat exchanged device 20 and is reduced in temperature before entering the second corona generator 16. Preferably, the gas is cooled to its original entry temperature and preferably by at least 100° C. The cooling of the gas is produced by heat exchange medium which enters the interior of the heat exchanger 20 by means of conduits 29 and 30. Subsequent to cooling, the gas leaves the heat exchanger 20 by means of conduit 25 and enters the second series connected ozone generator 16. The corona discharge reaction is repeated in the corona generator 16, and the reactant gas therefrom exits through conduit 26 and enters the second cooling device 21. The gas is again cooled in heat exchanger 21 and exits through conduit 27 and enters the third series connected ozone generator 17. Subsequent to reaction in the third ozone generator 17, the reactant gas exits through conduit 28. While the present FIGS. 1 and 2 show three series connected ozone generators, it is to be understood that typical systems may involve anywhere from two to as high as any number of generators as is desired. Typical installations will generally comprise three to 10 generators in series.

The system shown in FIG. 2 possesses very substantial advantages over prior art devices in that substantially all the excess heat of reaction is removed from the corona generator device by means of an extremely high flow of reactant gas. The reactant gas very efficiently cools the electrode surfaces due to the fact that the gas is in contact therewith and immediately removes excess heat prior to overheating of the dielectric and electrode surfaces. Typical prior art devices provide for primary cooling on the non-discharge side of the electrode surfaces; hence, the heat flow path is restricted both by the layer or reactant gas immediately adjacent the dielectric surface, and the inherent resistance to heat transmission offered by the dielectric and electrode surfaces per se. Furthermore, prior art devices which are cooled through external mechanical contact with the electrode surfaces must possess extremely complex and expensive external heat exchange means.

By operation of the device in FIG. 2 wherein cooling is achieved primarily by the reactant gas, it is found that the device may be operated under conditions of greatly increased power consumption. Typically, it is found that by intercooling the reactant gas as shown in the system of FIG. 2, the ozone generators may be driven at a much greater rate of power consumption. Typically, it is found that power consumption may be increased from on the order of 1,000 watts/ft$^2$ of electrode surface area to as high as 100,000 watts/ft$^2$ of electrode area. This means that in a typical instance the ozone production capacity of a given corona generator may be increased by an order of magnitude. That is, in a typical case, ozone production may be increased from about 10 lbs/day to as high as 1,000 lbs/day/ft$^2$ of electrode surface area.

To illustrate the specific operation of a typical device, the following example is set forth.

EXAMPLE

A system similar to that as shown in FIG. 2 was set up using three corona generators of FIG. 3, each of which possessed an electrode surface area of approximately 1 ft$^2$ and an electrode gap of 0.040 inches. Between the first and second corona generators a heat exchange device was series connected as shown in FIG. 2. Similarly, between the second and third ozone generators another heat exchange device was inserted. The heat exchange devices were water-cooled. The ozone generators were operated at a potential of approximately 12,000 peak volts and a frequency of approximately 10,000 cps through a transformer power source and consumed about 5,000 watts. Dry oxygen was admitted to the first ozone generator at a rate of approximately 50 cubic feet/minute. The dry oxygen entered the first device at ambient temperature and exited at a temperature of approximately 200° C. The gas from the first corona generator contained approximately 0.55 percent ozone. This reactant gas was then cooled by means of the heat exchanger to a temperature of approximately 75° C. The reactant gas entered the second corona generator at a temperature of 75° C and exited at a temperature of about 200° C. This exit gas contained 1.03 percent ozone. The reactant gas then entered the second heat exchanger whereby the temperature was again lowered to 75° C before entering the third corona generator. The gas from the third ozone generator possessed a temperature of about 200° C and a final ozone concentration of about 1.50 percent. By operating the system in the manner described it was found that ozone was produced consistently for extended periods at a rate of approximately 120 lbs. per day. This represented a production rate on the order of 40 pounds of ozone/ft$^2$ of electrode surface utilized. The amount of cooling water which was consumed was 50 gallons per pound of ozone and the temperature increase thereof was on the order of 20° C.

The above description and examples clearly indicate that more efficient and greater production of ozone may be obtained by utilization of the present system. Furthermore, it is found that in addition to ozone, many corona induced reactions may be carried out in the presently described system.

I claim:

1. In a method for conducting corona induced reactions which includes the steps of subjecting a gas to corona in at least two successive separate corona discharge zones connected in series, passing the reaction product gas from each corona discharge zone to the next successive corona discharge zone in the series, and cooling the reaction product gas between the successive corona discharge zones to remove heat generated in each corona discharge zone from the reaction product gas before passage thereof to the next successive corona discharge zone, the improvement comprising:
   a. flowing the gas through each of the successive corona discharge zones at a rate sufficient to remove substantially all of the excess heat of reaction therefrom by the gas flow;
   b. maintaining a power consumption in each of the successive corona discharge zones in the range of from about 1000 to 100,000 watts/ft$^2$ of discharge electrode surface; and
   c. reducing the temperature of the reaction product gas in the cooling between successive corona discharge zones by at least 100° C.

2. The method of claim 1 wherein said gas contains oxygen.

3. The method of claim 1 wherein said gas is air.

4. The method of claim 1 wherein said gas contains more than 90 percent by weight oxygen.

5. The method of claim 1 wherein said gas contains oxygen and a product gas stream is obtained which contains up to about 10 percent by weight ozone.

6. The method of claim 1 wherein said corona discharge zone is operated at a potential difference of from about 1,000 to 30,000 peak volts AC.

7. The method of claim 1 wherein the frequency of said potential ranges from about 60 to 100,000 cps.

8. The method of claim 1 wherein the gas pressure ranges from about ½ to 50 psia.

9. The method of claim 1 wherein the temperature of said gas ranges from about −50° to +250° C.

* * * * *